US006753772B2

(12) United States Patent
Winkler

(10) Patent No.: US 6,753,772 B2
(45) Date of Patent: Jun. 22, 2004

(54) METHOD AND ARRANGEMENT FOR DETECTING AND DIGITALLY TRANSMITTING MEASURED ANALOG OUTPUT VALUES OF A NUMBER OF TRANSDUCERS

(75) Inventor: Bert Winkler, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 183 days.

(21) Appl. No.: 10/192,312

(22) Filed: Jul. 10, 2002

(65) Prior Publication Data

US 2003/0011491 A1 Jan. 16, 2003

(30) Foreign Application Priority Data

Jul. 11, 2001 (DE) ........................................ 101 35 089

(51) Int. Cl.$^{7}$ .......................... G08B 29/00; H04Q 9/00

(52) U.S. Cl. .................. 340/511; 340/500; 340/870.07; 340/870.11; 340/870.21; 700/10; 341/155

(58) Field of Search ................................ 340/511, 500, 340/870.07, 870.11, 870.13, 870.21; 700/9, 10, 73; 341/126, 155

(56) References Cited

U.S. PATENT DOCUMENTS 4,839,652 A * 6/1989 O'Donnell et al. ......... 341/122
5,371,842 A * 12/1994 Easton et al. ............... 345/440

* cited by examiner

*Primary Examiner*—Donnie L. Crosland
(74) *Attorney, Agent, or Firm*—Baker Botts L.L.P.

(57) ABSTRACT

To develop a method according to WO 01/45232 in such a manner that it supplies good results in every case, in a method for detecting and digitally transmitting measured analog output values of a number of transducers to a protection or field device, the measured analog output values of each transducer (ECT1 . . . EVTBB) are converted into measured digital values (Md) at a sampling rate which is higher by a factor (m) than the minimum sampling rate, and are transmitted, the factor (m) being an integer divider of the number (n) of the filter coefficients of in each case one FIR filter (FIR) with filter coefficients of the value 1 in a data concentrator (26) for each transducer (ECT1 . . . EVTBB). The measured digital values (Md) are transmitted as a message to a data concentrator and from buffers (Buf1) associated with each transducer (ECT1 . . . EVTBB), data are transferred with a clock pulse into post-buffers (Buf2) preceding the FIR filters (FIR), the clock pulse being formed from the synchronous character of the respective message and the fixed clock of a clock generator. In the data concentrator, a transmit message with measured digital values of the transducers with reduced sampling rate are formed from output buffers (Buf3) following the FIR filters (FIR) by means of a multiplexer (27) and transmitted to the protection or field device.

7 Claims, 4 Drawing Sheets

METHOD AND ARRANGEMENT FOR DETECTING AND DIGITALLY TRANSMITTING MEASURED ANALOG OUTPUT VALUES OF A NUMBER OF TRANSDUCERS

BACKGROUND OF THE INVENTION

It is known that previously, when current or voltage transducers were connected, an analog point-to-point connection of the respective transducer to the associated protection or field device was implemented. For this purpose, each protection or field device contained a corresponding number of current and voltage inputs. The current and voltage inputs were implemented by means of a special terminals. The inputs were sampled simultaneously and synchronously with the program sequence of the corresponding protection or field device at a rate of, e.g. 1 . . . 5 ksamples/s. Current and voltage transformers were used for decoupling the inputs in the protection or field device with respect to DC.

The disadvantageous factors of this method and this arrangement, respectively, are the high rated kilovolt-amperes required for the transducers used since, as a result, these become expensive. For this reason, it has been attempted for a number of years to define a new interface with lower power which allows the transducers to be dimensioned more advantageously. At present, there are attempts to define an interface and a message structure for the digital transmission of transducer data. The draft standards IEC 61850-9-1 and IEC 60044-8 are results of these attempts. Both draft standards use the same message contents but different physical transmission means for transmitting the transducer data. In the draft IEC 60044-8, a synchronous serial interface with 2.5 Mbit/s and Manchester coding is proposed for transmitting the transducer data.

FIG. 1 shows a block diagram from these draft standards, which show the basic connection of a transducer 1 followed by a converter, for example an analog/digital converter 2 with associated power supply, to a digital transmission link 3. These draft standards provide for a precisely defined transmission time for a message with samples. The time between the sampling of the measured analog output value of the respective transducer and the reception of the message with the samples is defined. Secondary converters 4 and 5 are provided for matching purposes.

As can be seen in FIG. 2, it is proposed in the draft standards to combine the measured digital values of the transducers with the aid of a so called merging unit, a data concentrator 10, for a branch in, for example, a transformer substation. The data concentrator 10 outputs a message with the measured digital values at an output 11 to a protection or field device, not shown, and is connected to a clock generator, also not shown, via an auxiliary input 12. In FIG. 2, elements 1 and 2 according to FIG. 1 are in each case designated by PC and elements 4 and 5 are designated by SC.

The basis for a digital transmission of the measured digital value, formed from the measured output values of the transducers, to the data concentrator is an equidistant sampling of the individual measured analog output values of the transducers. It is also assumed that the sampling of the measured output values of the various current and voltage transducers also from different branches of the transformer substation must be synchronized in time. Two approaches to synchronizing the sampling present themselves:

The first approach could be a use of the interpolation method. In this method, the different known time delays between the sampling of the samples of the measured output values, sent in datagrams, and the reception of the datagrams in the data concentrator and the measurable delay between the reception of the various datagrams of the individual transducers are used for allocating a sampling time to each received sample which is accurate to the microsecond. Following this, an interpolation is performed between the individual samples in order to recalculate all received samples to a common sampling time. This situation is illustrated in FIG. 3. This figure is taken from the abovementioned draft standard.

The disadvantageous factor of this method is the high expenditure for the time stamping device for the received datagrams, which has an accuracy of approx. 100 ns, and the device required for interpolating the sampled signals in real time. If an interpolation polynomial (e.g. recursive third-order splines interpolation) is used for the interpolation, an additional interpolation error is caused by the interpolation. The result of the interpolation can no longer be described by means of a linear transfer function, i.e. the algorithm used is nonlinear. As an alternative, adaptive filters can also be used for the interpolation. In this case, the relatively high group delay of the all-pass filters (or low-pass filters with a cut-off frequency which is distinctly higher than the bandwidth to be used), which can be implemented in practice, has a disadvantageous effect. For the tracking of the adaptive filters, furthermore, a device is needed in this case by means of which the filter coefficients to be tracked can be calculated. The LMS algorithm, for example, is suitable for this purpose. To implement this algorithm, either a digital signal processor DSP or a complex ASIC is needed.

The second approach consists in utilizing a synchronization pulse throughout the transformer substation. Since the signals provided by the transducers are usually used by various devices in a transformer substation, it is actually never possible to split a transformer substation into individual sections in which a common sampling clock can be used for all measured transducer output values to be synchronized. It is always the entire transformer substation which must be supplied with a central sampling clock. In this case, all transducers can generate samples which are sampled synchronously to one another. FIG. 4 shows the figure used in the aforementioned draft standard for illustrating the synchronously sampled signals.

Methods which operate with a central clock for synchronizing the sampling of various transducers always present problems for reasons of reliability since, in the event of a failure of the central clock, all transducer signals of the entire transformer substation fail together. Redundancy concepts can only mask this fundamental problem since the clock to be used must always be generated at a central point for synchronizing the sampling. Furthermore, this method in principle requires a bidirectional connection to the individual transducers.

In the draft IEC 61850-9-1, a 100-Mbit Ethernet interface is proposed. The use of Ethernet interfaces basically requires a central sampling clock for synchronizing the sampling since it is not possible to guarantee a constant transmission time of the transducer signals via the Ethernet bus with this transmission method. The method for digitally transmitting transducer signals proposed in this draft standard is thus only another variant of implementation of the second method according to draft standard IEC 60044-8.

Both drafts are tailored for the requirements of control and protection systems. Both drafts are unsuitable for recording transients and for power quality measurements (sampling rates are too low). The sampling rates which can be achieved according to IEC 60044-8 and 61850-9-1 are within the range of 1 . . . 5 ksamples/s. The sampling rates required for transient recording and power quality measurements are within the range of 5 . . . 40 ksamples. These two drafts only describe the interface between switchgear and protection and field device. The acquisition and synchronization of the transducer data to one another remains open in these proposed solutions.

From international patent application WO 01/45232, a method for detecting and digitally transmitting measured analog output values of a number of transducers to a protection or field device is known in which the measured analog output values of each transducer are converted into measured digital values which are transmitted to a data concentrator; in the data concentrator, a message containing the measured digital values of the transducers is formed with a predetermined minimum sampling rate and the message is transmitted to the protection or field device at a sampling rate which is higher by a factor m than the minimum sampling rate, the measured analog output values are converted into the measured digital values and they are transmitted, the factor m being an integer divider of the number n of the filter coefficients of in each case one FIR filter (FIR) in the data concentrator for each transducer, from buffers associated with each transducer data are transferred with the clock pulse of a clock generator of the data concentrator into post-buffers preceding the FIR filters (FIR) and the message is assembled by means of a multiplexer from output buffers following the FIR filters (FIR).

SUMMARY OF THE INVENTION

The invention is based on the object of developing the known method described above in such a manner that it allows good results to be achieved in every case.

To achieve this object, according to the invention, a method for detecting and digitally transmitting measured analog output values of a number of transducers to a protection or field device is used, in which the measured analog output values of each transducer are converted into measured digital values at a sampling rate which is higher by a factor than the minimum sampling rate and are transmitted, the factor being an integer divider of the number of the filter coefficients of in each case one FIR filter with filter coefficients of the value 1 in a data concentrator for each transducer, the measured digital values are transmitted as a message to a data concentrator, data being transferred from buffers associated with each transducer with a clock pulse into post-buffers preceding the FIR filters, the clock being formed from the synchronous character of the respective message and the fixed clock of a clock generator, and in the data concentrator, a transmit message with measured digital values of the transducers with reduced sampling rate is formed from output buffers following the FIR filters by means of a multiplexer, and the transmit message is transmitted to the protection or field device.

In an advantageous embodiment of the method according to the invention, a message is generated with the measured digital values by means of a clock-synchronous logic arrangement and is transmitted by in each case one transmitter to in each case one data receiver at the data concentrator.

The invention is also related to an arrangement for detecting and digitally transmitting measured analog output values of a number of transducers to a protection or field device and has the object of improving the known arrangement which can be found in WO 01/45232.

According to the invention, this object is achieved in an arrangement for detecting and digitally transmitting measured analog output values of a number of transducers to a protection or field device, in which each transducer is followed by an analog-digital converter, operating with a sampling rate selected to be higher by a factor than the minimum sampling rate, for forming measured digital values; the factor being an integer divider of the number of the filter coefficients of in each case one FIR filter with filter coefficients of the value 1 in a data concentrator for each transducer; the outputs of the analog-digital converters are connected to the data concentrator and a buffer is associated with each transducer at the input of the data concentrator; post-buffers, the outputs of which are connected to the FIR filters, are connected to the buffers, and a multiplexer is connected to output buffers following the FIR filters; the data concentrator has an output, connected to the protection or field device, for sending off a transmit message with measured digital values of the transducers with reduced sampling rate.

In the arrangement according to the invention, the respective analog-digital converter is advantageously followed by a clock-synchronous logic arrangement for forming a message, and a transmitter.

BRIEF DESCRIPTION OF THE DRAWINGS

In further explanation of the invention.

DETAILED DESCRIPTION OF THE PREFERRED EMBODIMENTS

Figure 1:
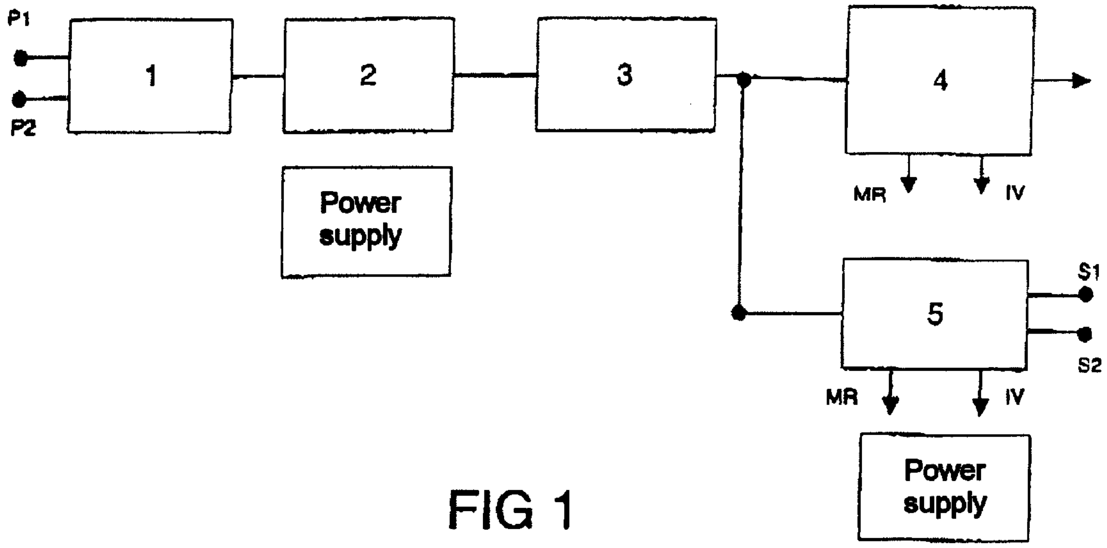
FIG. 1 shows a block diagram from a draft standard.
Figure 2:
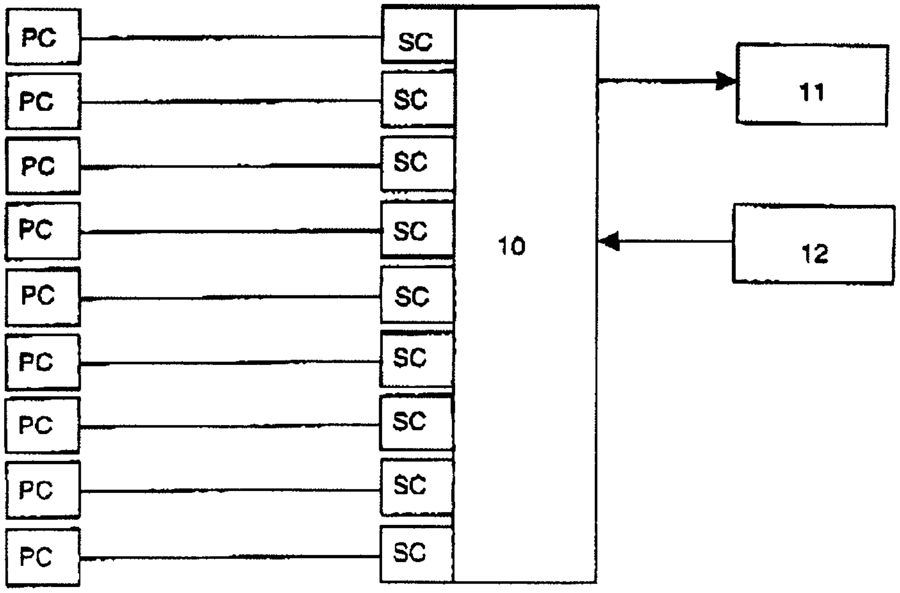
FIG. 2 shows a merging unit according to the draft standard.
Figure 3:
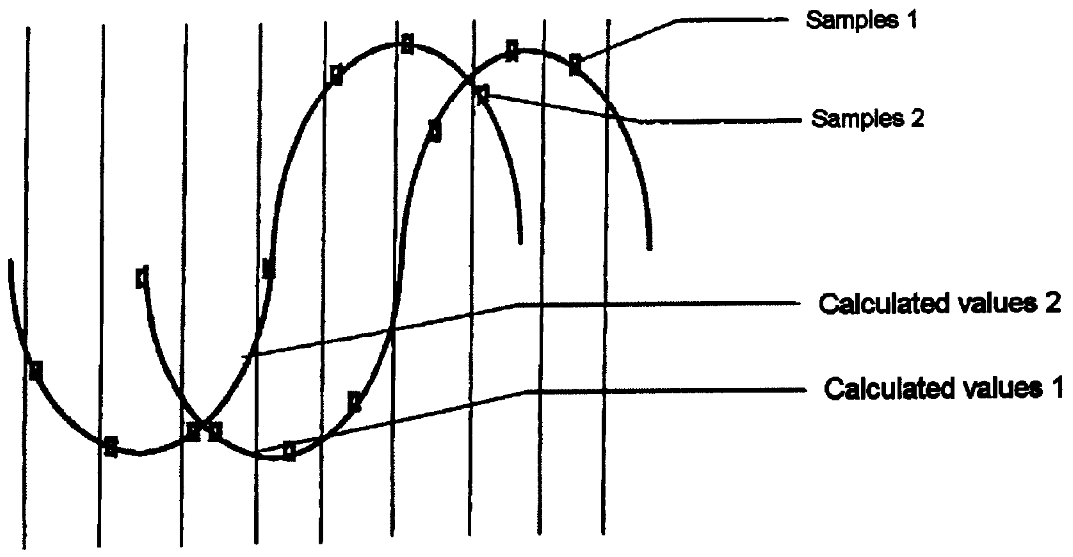
FIGS. 3 and 4 illustrate interpolation methods according to the draft standard.
Figure 4:
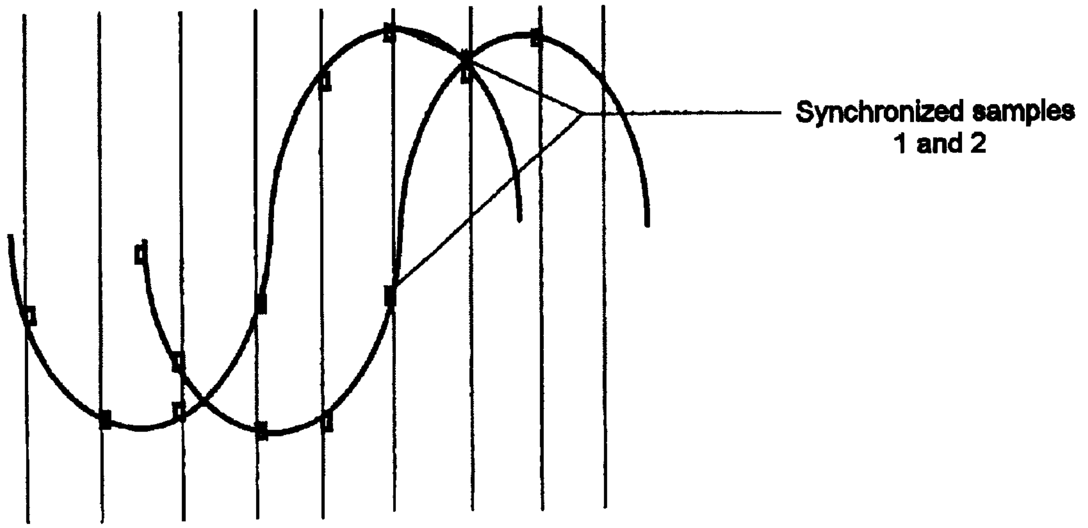
Figure 5:
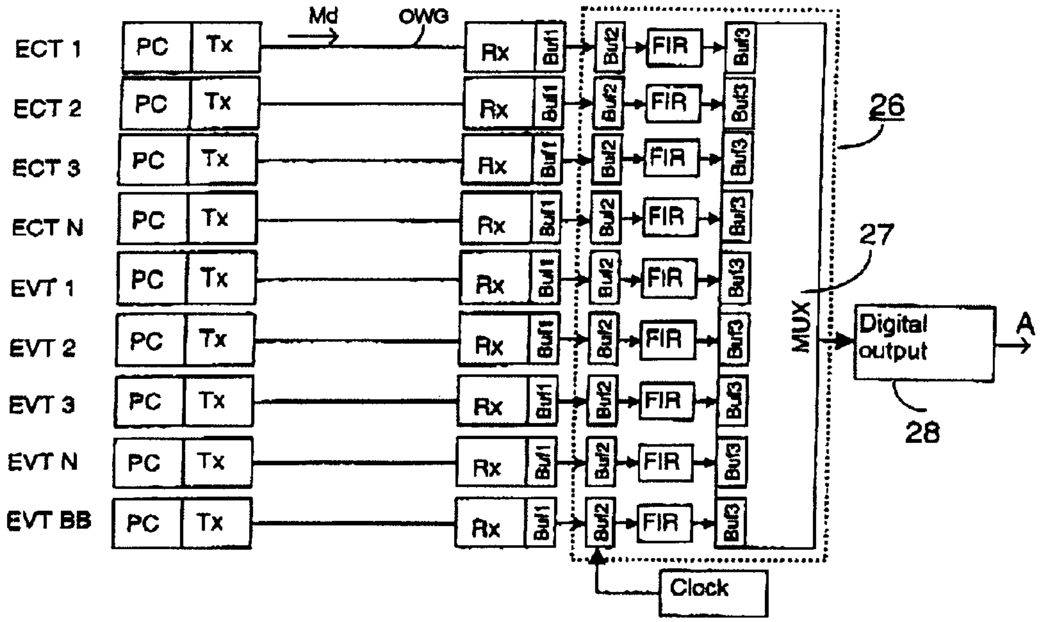
FIG. 5 shows an exemplary embodiment of the arrangement according to the invention.
Figure 6:
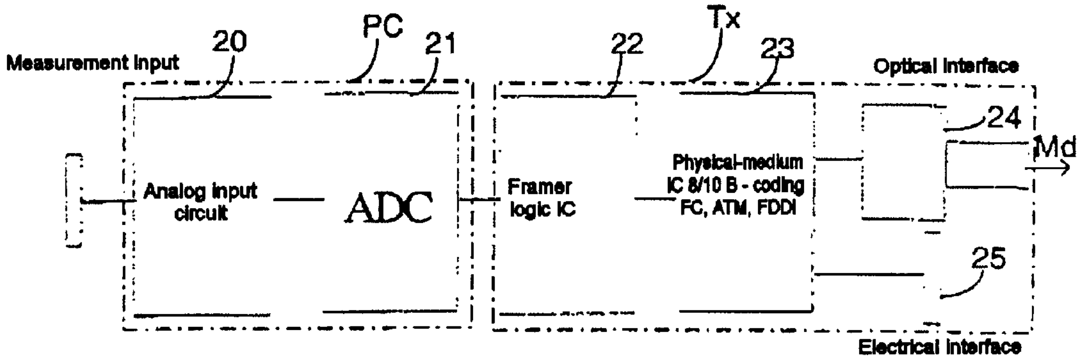
FIG. 6 shows a detailed representation of an exemplary embodiment of a primary part with the elements PC and Tx of the exemplary embodiment according to FIG. 5.

In the exemplary embodiment according to FIG. 5, the measured analog output values supplied by the transducers ECT1 to EVTBB (not shown) are sampled and converted in each case one chip PC with an analog input circuit 20 and an analog-digital converter 21 (compare FIG. 6). The chip PC is followed by a further chip Tx which can be constructed in detail in such a manner as is shown by the remaining part of FIG. 6 with elements 22, 23, 24 and 25, element 22 representing a frame logic chip, element 23 representing a coding chip, element 24 representing an optical interface and element 25 representing an electrical interface.

Figure 7:
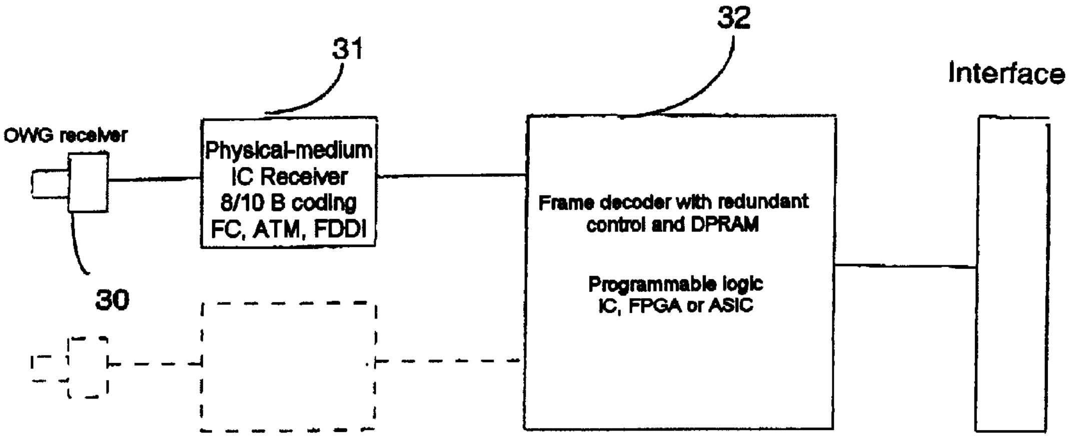
FIG. 7 shows a detailed exemplary embodiment of an input part of a protection or field device, not shown itself, connected to the arrangement according to FIG. 5.

The measured digital values Md at the output of the chips Tx of the arrangement according to FIG. 5 are transmitted to the data concentrator 26 via optical waveguides OWG in the form of messages, initially to data receivers Rx preceding the data concentrator 26, the inputs of which are equipped with optical receivers 30 as shown in FIG. 7. The messages in each case completely received by the data receiver Rx are written into the buffers Buf1 following the data receivers Rx with the clock pulse of the data receiver Rx. Each data receiver Rx is operated with its own clock pulse. This clock pulse is synchronous with the clock pulse of the transmitter Tx connected and is generated from the synchronous character of the message transmitted in each case.

The data concentrator 26 also contains FIR filters FIR which in each case follow post-buffers Buf2 which, in turn, are connected to the buffers Buf1. At the output end, output buffers Buf3 are connected to the filters FIR. The output buffers Buf3 are followed by a multiplexer 27.

Using this configuration, the measured digital values Md, in each case generated by the analog-digital converter 21, are transmitted clock-synchronously with the clock of the A/D conversion. The A/D conversion and the transmission of the samples via the optical waveguides OWG are effected with a sampling rate which is higher by a factor m compared with the sampling rate of the output signal A at the output chip 28 of the multiplexer 27, the factor m being an integer divider of the number of the filter coefficients n of the FIR filter FIR which is used for reducing the sampling rate of the transmitted measured digital value Md by the factor m. This is done by in each case using FIR filters with filter coefficients having the value 1. Thus, a summing of in each case m values occurs in the FIR filter. The data concentrator 26 is operated with its own clock. This clock is formed from the clock of a clock generator not shown which is asynchronous with the clock of the receiver Rx but has the same frequency. In addition, the synchronization signal of the message to the respective receiver Rx is used for forming the clock in that an individual clock is produced in each case when the synchronization signal occurs simultaneously with a pulse of the clock generator, not shown. The data of the completely received messages (that is to say the samples of the individual transducers) are transferred from the buffer Buf1 into all post-buffers Buf2 synchronously with the clock. Following that, all samples contained in the post-buffers Buf2 are supplied to the FIR filter FIR, acting as a low-pass filter, with filter coefficients of the value 1 in order to reduce the sampling rate of the received samples by the factor m; this is done in such a manner that m samples, transmitted by means of in each case one frame of the messages, are added by means of the FIR filter in cooperation with the output buffers Buf3. The output signals of the filters FIR are written into the output buffers Buf3 of the data concentrator 26 synchronously with the clock at a sampling rate which is lower by the factor m compared with the clock rate at the post-buffer Buf2.

To reduce the sampling rate, for example, the coefficients of the FIR filter are all set to 1 and added. It is only after e.g. 4 samples have been added in the multiplier adder unit of the FIR filter that the sum is output by the filter so that a reduction in a sampling rate by a factor of 4 has taken place in the present example.

The multiplexer 27 assembles from the samples with reduced sampling rate contained in its output buffers Buf3 a transmit message which is output clock-synchronously with the clock via the output chip 28 to the output transmission channel, not shown, of the data concentrator 26. The output chip can optionally have interfaces according to IEC 60044-8 and IEC 61850-9-1 for connecting external devices. The clock of the data concentrator 26 can also be optionally provided to an external device which processes the samples generated by the multiplexer 27.

In the arrangement according to the invention, the phase error of the samplings is thus minimized by "oversampling" of the measured analog output values of the transducers and synchronous "downsampling" in the data concentrator 26. The downsampling in the data concentrator 26 results in an increase in the resolution of the samples.

As shown in FIG. 7, the transducer data transmitted as transmit message from the multiplexer 27 can be prepared in a communication module which precedes a protection or field device, not shown. The communication module contains an integrated circuit 31 in the form of a physical-medium IC receiver 8/10B coding FC, ATM, FDDI . . . , and a chip 32 with frame decoder and DPRAM and a programmable integrated logic arrangement FPGA or ASIC; the chip 32 is followed by an interface.

The transmitted samples are resampled in the protection or field device. Since there are no processors (microcontrollers, digital signal processors, etc.) on the signal path, there is no temporal influence on the samplings due to interrupt latences. The entire signal preprocessing is exclusively done by synchronously clocked logic. Due to high sampling rates (>2 Msamples/s) and high transmission rates (>120 Mbit/s) the transmission of the measured digital values to the digital protection device (1 . . . 5 ksamples/s) acts as if it were transparent in time. The achievable phase error is less than 0.1°. This considerably reduces the computational expenditure in the protection and field devices (no computing-time-intensive methods such as interpolation of the measured values are necessary). This considerably simplifies the implementation of the proposed method in currently existing devices of this type. The use of synchronously clocked logic simplifies the construction of redundant controls in the data concentrator and in the protection or field device. The transmission links can be designed as optical waveguide cables or as shielded two-wire line (low-cost applications). When optical waveguides are used simultaneously with optical waveguide field bus technology for digital inputs and outputs, it becomes possible to implement protection and field devices having much improved EMC characteristics. Using modern optical transmit diodes (VCSEL) and passive optical splitters makes it possible to connect up to 8 protection or field devices to one data concentrator output.

What is claimed is:

1. A method for detecting and digitally transmitting measured analog output values of a number of transducers to a protection or field device, in which the measured analog output values of each transducer are converted into measured digital values at a sampling rate which is higher by a factor than the minimum sampling rate and are transmitted, the factor being an integer divider of the number of the filter coefficients of in each case one FIR filter with filter coefficients of the value 1 in a data concentrator for each transducer, the measured digital values are transmitted as a message to a data concentrator, data are transferred from buffers associated with each transducer with a clock rate into post-buffers preceding the FIR filters, the clock being formed from the synchronous character of the respective message and the fixed clock of a clock generator, and in the data concentrator, a transmit message with measured digital values of the transducers with reduced sampling rate is formed from output buffers following the FIR filters by means of a multiplexer, and the transmit message is transmitted to the protection or field device.

2. The method as claimed in claim 1, wherein a message is in each case generated with the measured digital values by means of a clock-synchronous logic arrangement and is transmitted by in each case one transmitter to in each case one data receiver at the data concentrator.

3. An arrangement for detecting and digitally transmitting measured analog output values of a number of transducers to a protection or field device, in which each transducer is followed by an analog-digital converter, operating with a sampling rate selected to be higher by a factor than the minimum sampling rate, for forming measured digital values, the factor being an integer divider of the number of the filter coefficients of in each case one FIR filter with filter coefficients of the value 1 in a data concentrator for each transducer, the outputs of the analog-digital converters are connected to the data concentrator, a buffer is associated with each transducer at the input of the data concentrator, post-buffers, the outputs of which are connected to the FIR filters, are connected to the buffers, a multiplexer is connected to output buffers following the FIR filters and the data concentrator has an output, connected to the protection or field device, for sending off a transmit message with measured digital values of the transducers with reduced sampling rate.

4. The arrangement as claimed in claim 3, wherein the respective analog-digital converter is followed by a clock-synchronous logic arrangement for forming a message, and a transmitter.

5. A method for detecting and digitally transmitting measured analog output values of a number of transducers to a protection or field device, in which the measured analog output values of each transducer are converted into measured digital values at a sampling rate which is higher by a factor than the minimum sampling rate and are transmitted, the factor being an integer divider of the number of the filter coefficients of a respective FIR filter in a data concentrator for each transducer, the measured digital values are transmitted as a message to a data concentrator, data are transferred from buffers associated with each transducer with a clock rate into post-buffers preceding the FIR filters, the clock being formed from the synchronous character of the respective message and the fixed clock of a clock generator, and in the data concentrator, a transmit message, with measured digital values of the transducers with reduced sampling rate is formed from output buffers following the FIR filters by means of a multiplexer, and the transmit message is transmitted to the protection or field device.

6. The method as claimed in claim 5, wherein the FIR filter comprises filter coefficients of the value 1.

7. The method as claimed in claim 5, wherein a message is in each case generated with the measured digital values by means of a clock-synchronous logic arrangement and is transmitted by in each case one transmitter to in each case one data receiver at the data concentrator.

* * * * *